US010195799B2

(12) United States Patent
Kim

(10) Patent No.: US 10,195,799 B2
(45) Date of Patent: Feb. 5, 2019

(54) POLARIZED LENS FILM PRODUCTION APPARATUS

(71) Applicant: Choong Deuk Kim, Gyeonggi-do (KR)

(72) Inventor: Choong Deuk Kim, Gyeonggi-do (KR)

(*) Notice: Subject to any disclaimer, the term of this patent is extended or adjusted under 35 U.S.C. 154(b) by 159 days.

(21) Appl. No.: 15/192,783

(22) Filed: Jun. 24, 2016

(65) Prior Publication Data

US 2016/0318266 A1 Nov. 3, 2016

Related U.S. Application Data

(63) Continuation of application No. PCT/KR2014/011048, filed on Nov. 18, 2014.

(30) Foreign Application Priority Data

Dec. 26, 2013 (KR) .................. 10-2013-0164420

(51) Int. Cl.
| | | |
|---|---|---|
| B29D 11/00 | (2006.01) | |
| G02B 5/30 | (2006.01) | |
| B29C 51/10 | (2006.01) | |
| B29C 51/22 | (2006.01) | |
| B29C 51/20 | (2006.01) | |
| B29C 51/18 | (2006.01) | |
| B29K 101/12 | (2006.01) | |
| B29K 105/00 | (2006.01) | |

(52) U.S. Cl.
CPC ........ B29D 11/00644 (2013.01); B29C 51/10 (2013.01); G02B 5/30 (2013.01); *B29C 51/18* (2013.01); *B29C 51/20* (2013.01); *B29C 51/22* (2013.01); *B29C 51/225* (2013.01); *B29K 2101/12* (2013.01); *B29K 2105/256* (2013.01)

(58) Field of Classification Search
CPC ......... B29C 51/10; B29C 51/18; B29C 51/20; B29C 51/22; B29C 51/225; B29D 11/00644
USPC ................................... 425/388, 402
See application file for complete search history.

(56) References Cited

U.S. PATENT DOCUMENTS

| | | | | |
|---|---|---|---|---|
| 8,715,549 B2 * | 5/2014 | Lee | ..................... | B29C 43/08 264/46.8 |
| 2014/0157576 A1 * | 6/2014 | Begon | .............. | B29D 11/00644 29/428 |

* cited by examiner

*Primary Examiner* — Seyed Masoud Malekzadeh
*Assistant Examiner* — Lawrence D. Hohenbrink, Jr.
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed herein is a polarized lens film production apparatus, which may include a cover part which is configured in a circular plate; a heater part which is disposed at an inner center part of the cover part; a body part which is formed in a cylindrical shape having an accommodation space; a center part which is disposed at an inner center portion of the body part; a plurality of connection pipe parts which are disposed at a side surface of the center part and are connected communicating with the center part; a plurality of dish-shaped forming frames which are disposed at the top of each of the connection pipe part; and a vacuum hole which is defined at a center portion of each of the dish-shaped forming frames and communicates with the connection pipe part, by means of which mass production is available.

5 Claims, 4 Drawing Sheets

POLARIZED LENS FILM PRODUCTION APPARATUS

CROSS REFERENCE TO RELATED APPLICATIONS

This application is a continuation application of International Application No. PCT/KR2014/011048 filed on Nov. 18, 2014, which claims priority to Korean Application No. 10-2013-0164420 filed on Dec. 26, 2013, which applications are incorporated herein by reference.

TECHNICAL FIELD

The present invention relates to a polarized lens film production apparatus, and in particular to a polarized lens film production apparatus the thickness of which is 0.3 to 1.5 mm.

BACKGROUND ART

A functional film, in general, is laminated on the surface of an ophthalmic lens, for example, a lens for glasses, a contact lens, etc. The lamination method may be carried out by a method, for example, a transcription, a formation, etc.

As a method for forming a film on the surface of an ophthalmic lens, there is the Korean patent registration method No. 10-1283459 (registered on Jul. 2, 2013, a forming apparatus of a flat film on an optical lens, a functionalization method of an optical lens by this forming apparatus, and an optical lens).

As for the contents of the aforementioned registered patent, it is employing a method wherein a flexible flat film is directly attached to the surface of a lens, and the flexible flat film is deformed to match with the curvature of a lens by supplying pressure, whereupon it can be consequently attached to the front surface of the lens.

To this end, there are provided a mechanical piston which carries out a vertical translational motion, a module equipped with a plate engaged to the top of the mechanical piston, an anti-return device for limiting the height of the plate in the module, a lens holder for fixing an optical lens at the top of the plate, a film carrier for fixing the film at the top of the lens holder, a stamp which is laid vertical at the module, and a mechanical translational unit which allows the stamps to carry out a vertical and horizontal motion. In this configuration, a pressure can be supplied until the flat film can contact at equal angles with the lens with the aid of a relative motion between the stamp and the mechanical piston, by means of which the flat film can be attached to the surface of the lens which has a predetermined curvature.

In the aforementioned method, it is impossible to guarantee that all portions of a film can elongate at the same elongation percentages and can convert into a film having a predetermined curvature depending on a pressure condition and a film state during a procedure where a flexible flat film is converted into a flexible film having a predetermined curvature in such a way to directly press the flexible flat film on a lens having a predetermined curvature. For this reason, the reliability of a product may be degraded, and yield may be lowered.

In the aforementioned conventional apparatus, since a flexible plan film should be attached to every lens one by one, a mass production is not available.

SUMMARY OF THE DISCLOSURE

The present invention has been made in an effort to solve the above-described problems associated with prior art. It is an object of the present invention to provide a polarized lens film production apparatus by which a flexible flat film can have an even elongation percentage, while providing a good optical performance.

Moreover, it is another object of the present invention to provide a polarized lens film production apparatus which is able to manufacture, at the same time, a film having various sizes and curvatures.

To achieve the above objects, there is provided a polarized lens film production apparatus, which may include a cover part which is configured in a circular plate structure wherein an inner side thereof is formed upwardly concave and is equipped with an open cut-away part which is cut away by a predetermined distance in an arc shape from the center of the circular plate structure to an end portion thereof; a heater part which is disposed at an inner center part of the cover part; a body part which is formed in a cylindrical shape having an accommodation space in the inside thereof and is equipped with a lower cut-away part which corresponds to a space defined at a lower portion of the open cut-away part in a state where the cover part is covered; a center part which is disposed at an inner center portion of the body part and is configured to be rotatable and to which a vacuum line is connected; a plurality of connection pipe parts which are disposed at a side surface of the center part and are connected communicating with the center part; a plurality of dish-shaped forming frames which are disposed at the top of each of the connection pipe part; and a vacuum hole which is defined at a center portion of each of the dish-shaped forming frames and communicates with the connection pipe part.

The polarized lens film production apparatus according to the present invention may use a plurality of dish-shaped frames having difference sizes and curvatures, thus mass-producing the polarizing lens film which matches with the sizes and curvatures of the aforementioned dish-shaped frames.

Moreover, the whole surfaces of the film can elongate at even elongation percentages, by which the whole thickness of the film can be made even, whereupon optical characteristics, for example, colors, polarization, etc. can be maintained, while preventing any yield degradation.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

In the best modes for carrying out the invention, there is provided a polarized lens film production apparatus, which may include a cover part which is configured in a circular plate structure wherein an inner side thereof is formed upwardly concave and is equipped with an open cut-away part which is cut away by a predetermined distance in an arc shape from the center of the circular plate structure to an end portion thereof; a heater part which is disposed at an inner center part of the cover part; a body part which is formed in a cylindrical shape having an accommodation space in the inside thereof and is equipped with a lower cut-away part which corresponds to a space defined at a lower portion of the open cut-away part in a state where the cover part is covered; a center part which is disposed at an inner center portion of the body part and is configured to be rotatable and to which a vacuum line is connected; a plurality of connection pipe parts which are disposed at a side surface of the center part and are connected communicating with the center part; a plurality of dish-shaped forming frames which are disposed at the top of each of the connection pipe part; a vacuum hole which is defined at a center portion of each of the dish-shaped forming frames and communicates with the connection pipe part; and a flexible partition wall which positions along the circumference of each of the open cut-away part and the lower cut-away part and is divided into upper and lower parts.

The polarized lens film production apparatus according to the present invention will be described with reference to the accompanying drawings.

Figure 1:
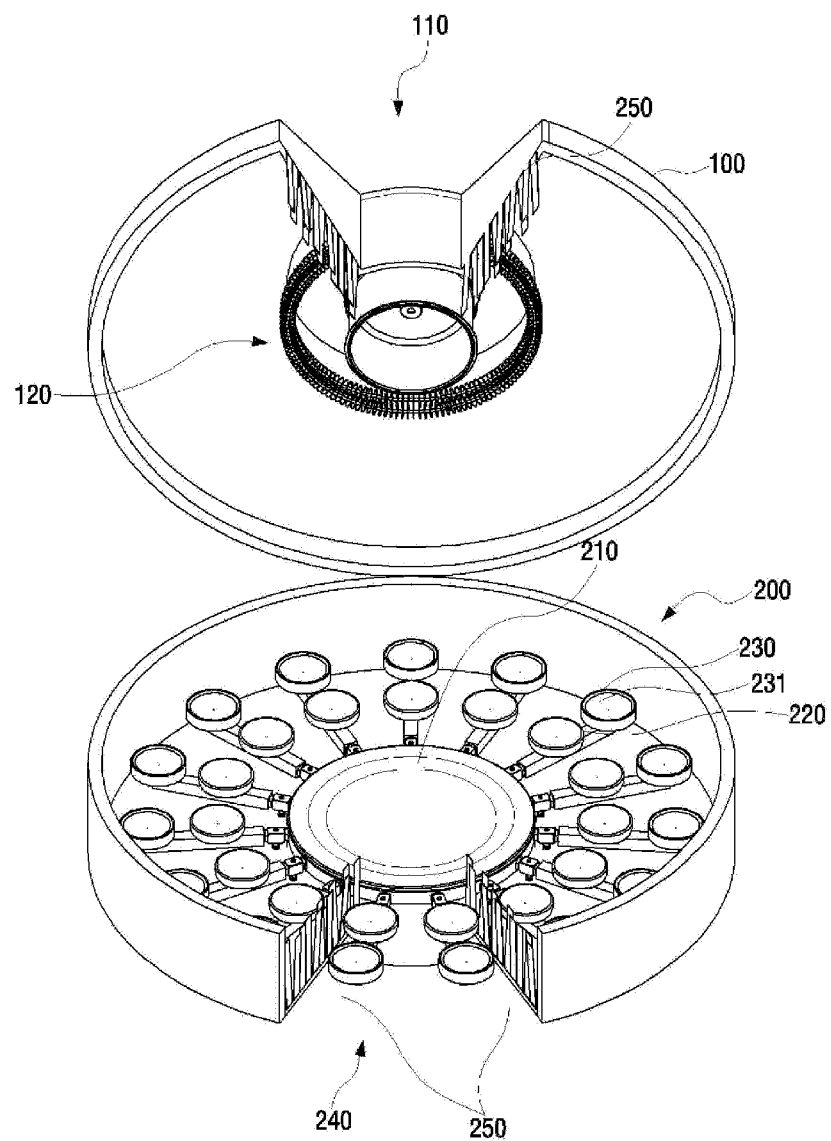
FIG. 1 is a separated perspective view illustrating a polarized lens film production apparatus according to a preferred embodiment of the present invention.
Figure 2:
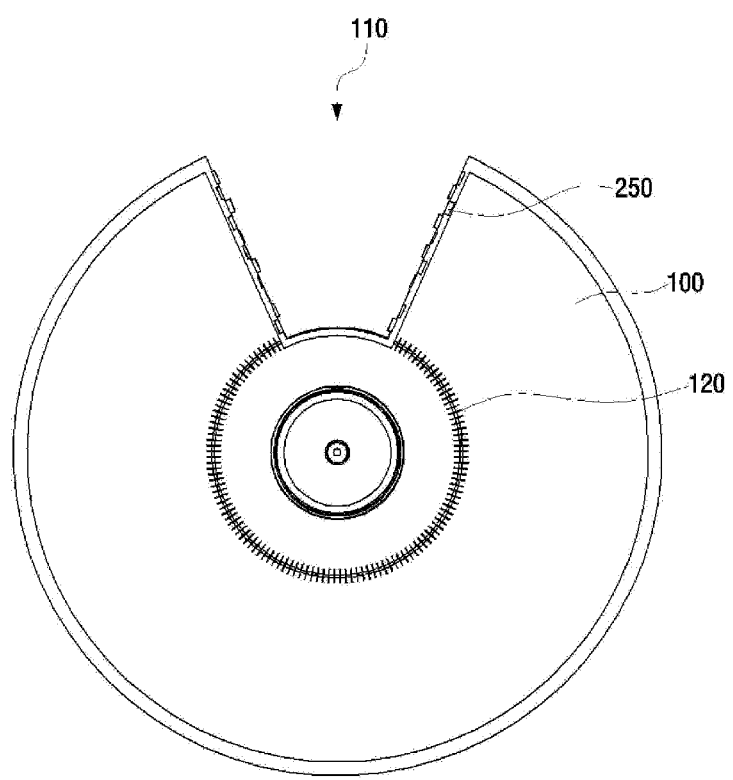
FIG. 2 is a plane view illustrating an inner side of a cover part in FIG. 1.
Figure 3:
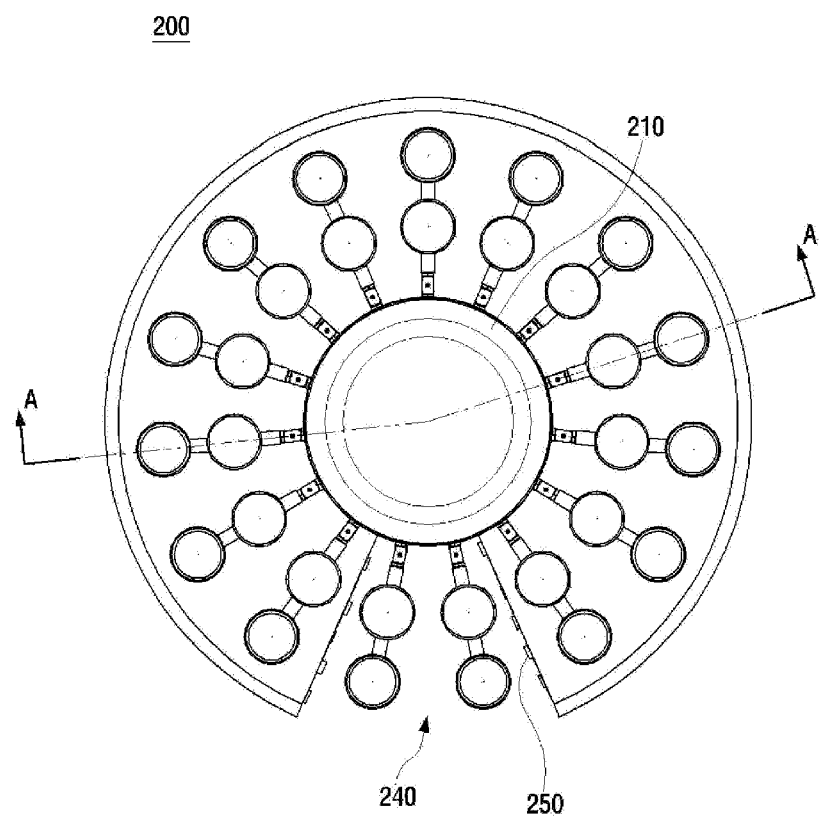
FIG. 3 is a plane view illustrating a body part in FIG. 1.
Figure 4:
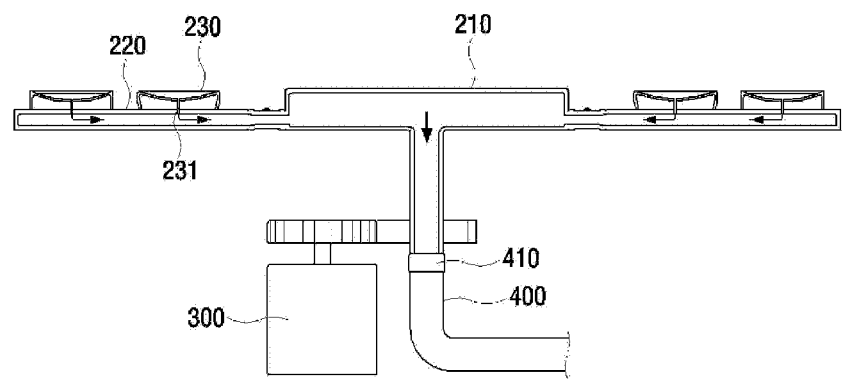
FIG. 4 is a cross sectional view taken along line A-A in FIG. 3.

FIG. 1 is a separated perspective view illustrating a polarized lens film production apparatus according to a preferred embodiment of the present invention, FIG. 2 is a plane view illustrating an inner side of a cover part in FIG. 1, FIG. 3 is a plane view illustrating a body part in FIG. 1, and FIG. 4 is a cross sectional view taken along line A-A in FIG. 3.

Referring to FIGS. 1 to 4, a polarized lens film production apparatus according to a preferred embodiment of the present invention may include, but is not limited to, a cover part 100 which is configured in a circular plate structure wherein an inner side thereof is formed upwardly concave and is equipped with an open cut-away part 110 which is cut away by a predetermined distance in an arc shape from the center of the circular plate structure to an end portion thereof; a heater part 120 which is disposed circular at an inner center part of the cover part 100; a body part 200 which is formed in a cylindrical shape having an accommodation space in the inside thereof and is equipped with a lower cut-away part 240 at a lower portion of the open cut-away part 110 in a state where the cover part 100 is covered; a center part 210 which is disposed at an inner center portion of the body part 200 and is configured to be rotatable and to which a vacuum line 400 is connected; a plurality of connection pipe parts 220 which are disposed at a side surface of the center part 210 and are connected communicating with the center part 210; a plurality of dish-shaped forming frames 230 which are disposed at the top of each of the connection pipe part 220; and a vacuum hole 231 which is defined at a center portion of each of the dish-shaped forming frames 230 and communicates with the connection pipe part 220.

A flexible partition wall 250 positions along the circumference of each of the open cut-away part and the lower cut-away part and is divided into upper and lower parts.

A flexible partition wall 250 is disposed at an edge of each of the open cut-away part 110 and the lower cut-away part 240.

A motor 300 configured to rotate the center part 210 is provided at a lower portion of the center part 210. A vacuum line 400 of a vacuum pump is engaged to the rotation center of the center part 210, by which a negative pressure may generate at a vacuum hole 231 of the dish-shaped forming frame 230.

The configuration and operation of the polarized lens film production apparatus according to a preferred embodiment of the present invention will be described.

The open cut-away part 110 and the lower cut-away part 240 position above and below at the cover part 100 and the body part 200. A worker is able to visually check a work state via the open cut-away part 110 and the lower cut-away part 240.

The flexible partition wall 250 is provided at an edge of each of the open cut-away part 110 and the lower cut-away part 240 so as to keep a predetermined level temperature inside of a space defined by the cover part 100 and the body part 200.

The flexible partition wall 250 is divided into upper and lower parts, thus allowing the connection pipe part 220 to pass when the center part 210 of the body part 200 rotates. The flexible partition wall 250 may be divided into multiple parts leftward and rightward, by which any resistance interference of the flexible partition wall 250 can be minimized.

The cover part 100 is hinged at the body part 200. A flat film can be placed on each dish-shaped forming frame 230 in a state where the cover part 100 has been lifted up at one side. The film is cut to match the size of a finished product having a predetermined curvature.

A plurality of the dish-shaped forming frames 230 may have different curvatures and sizes, but alternatively they may be substituted with dish-shaped forming frames which all have the same curvatures and sizes. More specifically, the dish-shaped forming frame 230 may be substituted, if necessary. The same products can be mass-produced, and products may be produced less.

Figure 5:
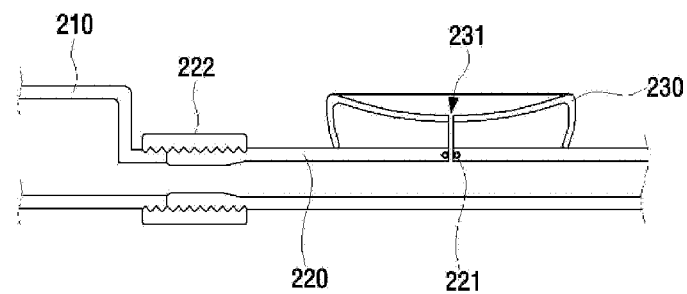
FIG. 5 is a cross sectional view illustrating a connection pipe part and a dish-shaped forming frame according to the present invention.

FIG. 5 is a cross sectional view illustrating the connection pipe part and the dish-shaped forming frame.

Referring to FIG. 5, the dish-shaped forming frame 230 is inserted into the upper portion of the connection pipe part 220, and an O-ring 221 is provided between the dish-shaped forming frame 230 and the connection pipe part 220 so as to maintain a negative pressure. The aforementioned engagement example is directed to a structure wherein the dish-shaped forming frame 230 is inserted in the connection pipe part 230. Such an engagement may be changed into a rotatable engagement structure.

In addition to the method wherein the dish-shaped forming frames 230 are individually substituted, the connection pipe part 220 to which a plurality of the dish-shaped forming frames 230 are connected, may be substituted.

An engaging pipe 222 may be disposed between the connection pipe part 220 and the center part 210. The connection pipe part 220 and the center part 210 are thread-engaged via the engaging pipe 222. For this reason, the connection pipe part 220 may be substituted with a connection pipe part to which the dish-shaped forming frame having different size or curvature is engaged.

In a state where the film is placed on the dish-shaped forming frame 230, the cover part 100 is covered, and electric power may be supplied to the heater part 120 disposed at an inner portion of the cover part 100, and then the film may be preheated to a predetermined level high enough to form the film.

The film may be made of any of a TAC (triacetylcellulose) film, a PC (polycarbonate) film, a PVA (polyvinyl alcohol) film, a PU (polyurethane) film and a PI (polyimide) film. It is preferred that the preheating temperature is 80 to 110° C.

In the aforementioned preheating procedure, the center part 210 rotates by the motor 300, and the dish-shaped forming frames 230 on which the films are placed, rotate, by means of which heat can be evenly transferred thanks to the rotating film.

If the internal pressure inside of the center part 210 is lowered via the vacuum line 400 using the vacuum pump (not illustrated) after the preheating has been carried out for 2 to 3 minutes, a negative pressure may generate inside of a vacuum hole 231 defined in the center of the dish-shaped forming frame 230 due to the change to the pressure. The vacuum line 400 is connected via a joint 410 for the sake of a connection to the center part 210, which corresponds to the rotatable body, thus preventing any entanglement.

The film placed on the dish-shaped forming frame 230 may contact close with the dish-shaped forming frame 230 due to the aforementioned negative pressure. The vacuum pressure at this stage is 600 to 700 mmHg. If the vacuum pressure is lower than the minimum value of the vacuum pressure, the center of the formed film may sink into the inside of the vacuum hole 231, thus forming a protrusion. If the vacuum pressure is over the maximum value of the vacuum pressure, the film may not evenly contact close with the dish-shaped forming frame.

Next, the user confirms if the film has contacted close with the dish-shaped forming frame 230 which had moved to the positions of the open cut-away part 110 disposed at the cover part 100 and of the lower cut-away part 240 disposed at the body part 200. In a state that the close contact has been confirmed, the heating operation by the heater part 120 may be maintained for 2 to 4 minutes, by which the film can be formed in a state where it has contacted close with the dish-shaped forming frame. At this time, the temperatures inside of the cover part 100 and the body part 200 are maintained at 80 to 110° C. with the aid of the heater part 120.

In this way, it is possible to confirm, via the open cut-away part 110 and the lower cut-away part 240, the forming state of the film which has contacted close with the dish-shaped forming frame 230 which has been exposed to external air. To make the confirmation of such a state accurate, the center part 210 may be controlled to become a temporal stop state after it has rotated at a predetermined angle.

For example, the center part 210 may be rotated by 15° and then may be stopped for 3 seconds, and then may be further rotated by 15°. For this operation, the motor 300 may be formed of a stepping motor or a pneumatic cylinder may be used to stop rotations by pressing the center part 210, by which the center part 210 can be stopped after it has been rotated by a predetermined angle.

With the aid of the aforementioned operation, the user can accurately confirm via the open cut-away part 110 and the lower cut-away part 240 if the film has contacted close with the dish-shaped forming frame 230. The number of the connection pipe parts 220 exposed via the open cut-away part 110 and the lower cut-away part 240 may be one or two. Assuming that three or five dish-shaped forming frames 230 may position at each connection pipe part 220, the films that the worker should confirm, may become three to the minimum to ten to the maximum.

If the forming is completed, the operation of the heater part 120 is stopped, and the operation of the vacuum pump is stopped to prevent the generation of a negative pressure in the vacuum hole 231, and the operation of the motor 300 is stopped.

The formed film is a finished product. The thusly manufactured film may be attached to the surface of the lens and then may be used.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The present invention is directed to a polarized lens film production apparatus the thickness of which is 0.3 to 1.5 mm, which can be used in a product, for example, sunglasses or a lens which may be formed of a polarizing lens, so the present invention has a high industrial applicability.

What is claimed is:

1. A polarized lens film production apparatus, comprising:
a cover having a circular plate structure, wherein an inner side thereof is formed upwardly concave and includes an open cut-away part which is cut away by a predetermined distance in an arc shape from a center of the circular plate structure to an end portion thereof;
a heater disposed at an inner center portion of the cover;
a body having a cylindrical shape that includes an accommodation space in an inside thereof and includes a lower cut-away part which corresponds to a space defined at a lower portion of the open cut-away part when the cover is coupled to the body;
a center component disposed at an inner center portion of the body and is configured to be rotatable, wherein a vacuum line is connected to the center component;
a plurality of connection pipes disposed at a side surface of the center component and are connected to communicate with the center component;
a plurality of dish-shaped forming frames disposed at a top of each of the connection pipes;
a vacuum hole which is defined at a center portion of each of the dish-shaped forming frames and communicates with the connection pipes; and
a flexible partition wall disposed along radial edges of each of the open cut-away part and the lower cut-away part and is divided into upper and lower parts.

2. The apparatus of claim 1, wherein the center component is configured to perform an operation in which the center component rotates at a set angle and allows the connection pipes and the dish-shaped forming frames to be exposed via the open cut-away part and the lower cut-away part, and then stops for a set time.

3. The apparatus of claim 2, wherein the center component is configured to repeatedly rotate and stop with an aid of a stepping motor or is configured to rotate by a motor and stop by a pressing cylinder which is configured to press the center component.

4. The apparatus of claim 1, wherein the dish-shaped forming frames are connected separably to the connection pipes and replaceable with other forming frames having different sizes and curvatures.

5. The apparatus of claim 1, wherein the connection pipes are connected separably to the center component and replaceable with other forming frames having different sizes and curvatures.

* * * * *